United States Patent [19]

Halewijn

[11] 4,421,263

[45] Dec. 20, 1983

[54] BI-DIRECTIONAL CLUTCHLESS FILM TRANSPORT DEVICE

[75] Inventor: Harry J. Halewijn, Manchester, Mass.

[73] Assignee: Itek Corporation, Lexington, Mass.

[21] Appl. No.: 354,821

[22] Filed: Mar. 4, 1982

[51] Int. Cl.³ .................... B65H 17/26; B65H 17/22
[52] U.S. Cl. .................................. 226/143; 226/181
[58] Field of Search .................... 226/89–91, 226/109, 108, 4, 143, 180, 181, 190, 196; 271/272–274; 242/76

[56] References Cited

U.S. PATENT DOCUMENTS

| | | | |
|---|---|---|---|
| 3,191,834 | 6/1965 | Nakauchi | 226/38 |
| 3,292,444 | 12/1966 | Bentley | 74/206 |
| 3,415,435 | 12/1968 | Bevis | 226/102 |
| 3,762,619 | 10/1973 | Leavitt et al. | 226/109 |
| 3,968,917 | 7/1976 | Lanahan | 226/182 X |
| 4,046,372 | 9/1977 | Ebner | 271/273 |
| 4,089,254 | 5/1978 | Kindig | 226/181 X |

*Primary Examiner*—Leonard D. Christian
*Attorney, Agent, or Firm*—Homer O. Blair; Robert L. Nathans; Gerald H. Glanzman

[57] ABSTRACT

A bi-directional film transport device includes an upper and lower plate member having a separation gap between a first and second pair of drive rollers, the bytes of which are positioned adjacent the gap. A single drive motor is rigidly rotationally coupled to drive the first and second pair of drive rollers and the plate members function to eliminate the tendency of the film to buckle, which in turn maintains the film in the proper plane of focus. As a result of this simple arrangement, complex clutch mechanisms which are otherwise employed to maintain tension during bi-directional operation have been eliminated. Side walls coupled between the plates parallel to the path of film travel prevent skewing of the film driven by the short low inertia high speed drive rollers.

28 Claims, 3 Drawing Figures

BI-DIRECTIONAL CLUTCHLESS FILM TRANSPORT DEVICE

BACKGROUND OF THE INVENTION

In phototypesetting machines, it is often desirable to drive the film in both a forward and a reverse direction within the imaging plane, without causing buckling of the film, which buckling degrades the image projected upon the film. For single direction operation, the transport device disclosed in U.S. Pat. No. 4,046,372 to Peter Ebner is satisfactory. However, should this device be employed for bi-directional film transport, the film will buckle when being drive in the reverse direction by the single pair of drive rollers especially if an encoder is used to measure the travel for corrective feedback, and if this encoder actually is driven by the medium. U.S. Pat. No. 3,411,584 employs an active tensioning system utilizing an auxiliary motor that is connected to a tension roller by a slip coupling. During feed cycles, the frictional force generated by the moving sheet material overcomes the slip coupling to rotate the tension roller. Conversely, during static periods, the auxiliary motor drives the tension roller in a reverse direction to maintain tension on the stationary sheet. Although maintaining tension during both static and dynamic periods, the system disclosed in this patent exhibits the disadvantage of producing continuous rotation of the tension drive mechanism. For bi-directional operation, a second pair of drive rollers have been employed in the prior art to maintain the proper tension in both the forward and reverse direction to prevent buckling.

In a co-pending application of Alfred Ouelette, Ser. No. 159,428 filed June 16, 1980 now U.S. Pat. No. 4,351,460, two pairs of drive rollers are employed for bi-directional operation along with a relatively complex mechanism which employs clutches to obtain the differential speed necessary to keep the paper in tension for proper focusing. While this solenoid controlled paper transport is satisfactory for newspaper applications, it is desirable to provide a bi-directional transport useful in connection with more demanding commercial applications and yet is extremely simple to manufacture, and thus, more reliable and less costly.

SUMMARY OF THE INVENTION

In accordance with a preferred embodiment of the present invention, the above stated objects are effected by providing a first and second roller pair rigidly coupled together in a rotational sense and simultaneously driven by a bi-directional stepping motor. An upper plate and a lower plate defining a film containing gap of preferably about 20 mils, are positioned between the two roller pairs, which in turn are positioned adjacent the end portions of the upper and lower plates having the gap therebetween. The plates function as antibuckling devices which, in a simple and reliable manner, prevent film buckling thereby to maintain the film precisely in the imaging plane. The roller pairs are centrally positioned across the width of the film and have lengths considerably less than the widths of the upper and lower plates, to reduce inertia and thus increase drive speeds. The plates are coupled together by side wall portions along the length of the plates perpendicular to the longitudinal axes of the rollers and the side wall portions create reaction forces at the film edges to prevent skewing of the film.

Other objects, features and advantages of the present invention will become apparent upon study of the following description taken in conjunction with the drawings in which.

DETAILED DESCRIPTION

Figure 2:
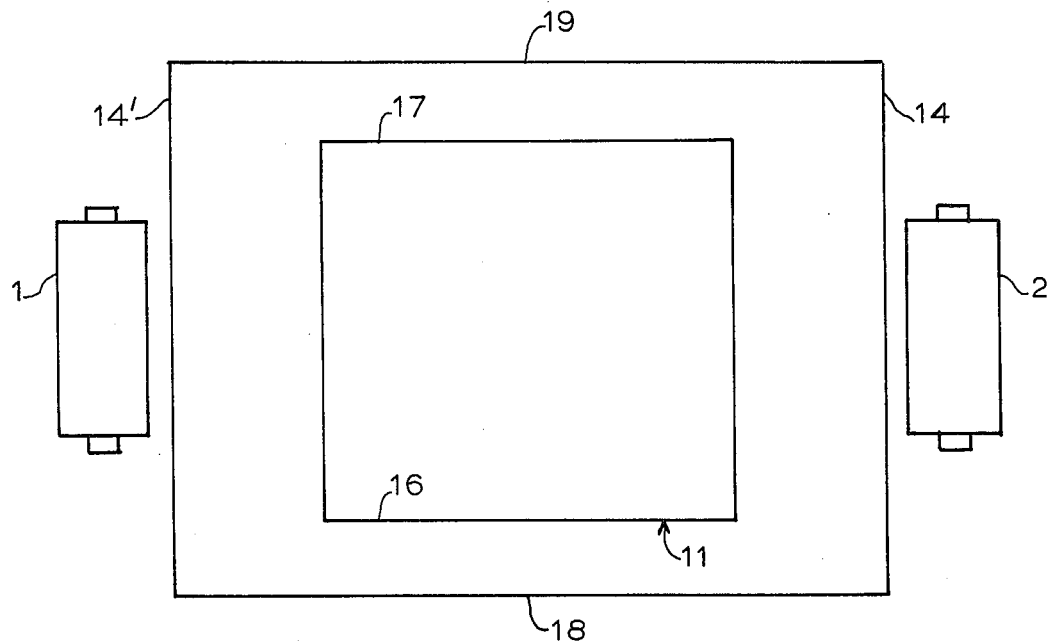
FIG. 2 illustrates a plan view of the preferred embodiment.
Figure 1:
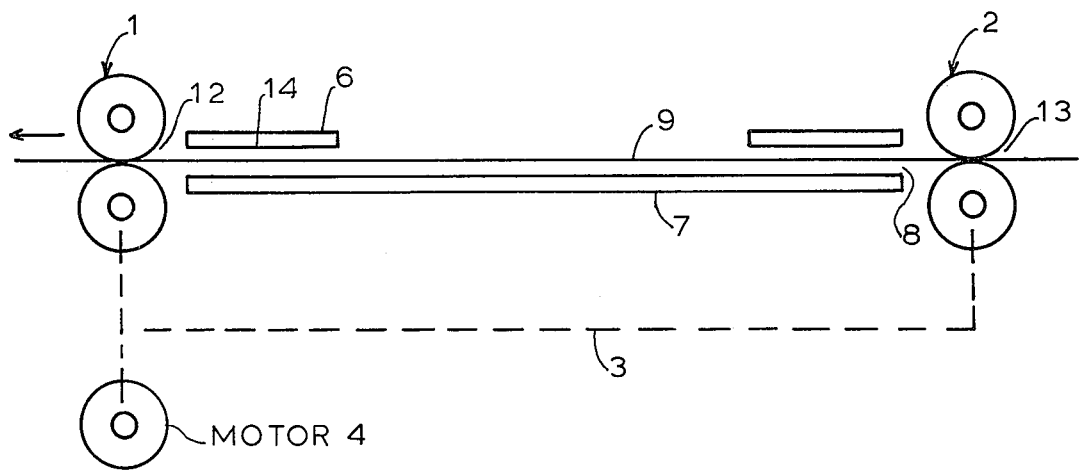
FIG. 1 illustrates a side view of the preferred embodiment.

Referring now to FIGS. 1 and 2, a first roller pair 1 and a second roller pair 2 are provided, such roller pairs being rigidly rotationally coupled together by, for example, a conventional belt drive arrangement, schematically illustrated by dashed line 3, which in turn is driven by bi-directional stepping motor 4. An apertured upper plate 6 and lower plate 7 is positioned between roller pairs 1 and 2, such plates being separated to form a gap 8 for receiving film 9, positioned within said gap. This arrangement facilitates the bi-directional movement of the film across the imaging area within aperture 11, without film buckling, which would tend to create distorted images.

Let it be assumed that the medium is essentially driven and moving to the left and that due to a structural inaccuracy or pressure change associated with roller pair 1, the tangential film drive velocity at the byte 12 of roller pair 1 increases. Such action increases the amount of film pulled through byte 12 toward the left which increases the tension in film 9, which in turn causes an increase in the amount of film pulled through byte 13 of roller pair 2 due to film/roller slippage, thereby to decrease the tension, which would otherwise tend to build up. Since the rollers are fairly compliant (e.g. 70 durometers) slippage of film in the bytes of the rollers is produced with increased tension. On the other hand, let it be assumed that the action of right hand roller pair 2 causes an increase in the tangential roller velocity at byte 13. This action would tend to increase the amount of film driven to the left to in turn tend to make the film buckle in the area to the right of byte 12 of roller pair 1. This buckling, however, is resisted by the reaction forces applied across the width of the film by the lower surface 14 of the upper plate member 6 (or the upper surface of the lower plate depending on the direction of buckling) to the right of byte 12 of roller pair 1, which in turn causes more film to be driven to the left through byte 12 of roller pair 1 due to the compressive pushing action through the byte 12. Again, film/roller slippage facilitates this action. Should the film be driven to the right rather than the left, the entire process is reversed, but since the structure is symmetrical about the center of the plates, the same results will be obtained. As a result of the above-described functioning of the present invention, the paper is not permitted to attain a substantial compressive or unduly elevated tension state and is thus maintained flat in the imaging plane to prevent distortion of the images which are projected by a lens system, not shown, and focused upon the upper surface of film 9 within the area defined by aperture 11. Hence, both the upper surface of the lower plate 7 and the lower surface of upper plate 6 function to eliminate the tendency of the film to buckle depending upon whether the film tends to bow or buckle downwardly or upwardly.

Figure 3:
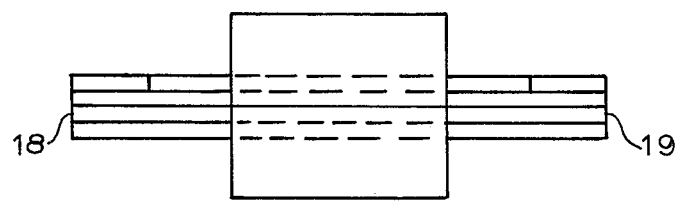
FIG. 3 illustrates an end view of the preferred embodiment.

As shown in FIGS. 2 and 3, roller pairs 1 and 2 have a length along the longitudinal axes of rotation thereof which is substantially less than the width of the plates along edges 14 and 14'. The use of relatively short drive rollers is significant since such rollers have substantially less inertia than conventional rollers extending fully across the width of the plates, and as a result, film drive speeds may be substantially increased in both the forward and reverse directions. There is a tendency of the film to skew, that is to be driven at a small acute angle relative to edges 16 and 17 of the plates. However, in accordance with the present invention, the tendency of the relatively short rollers to drive the film in a skewed manner does not actually produce substantial detrimental skewing owing to the reaction forces applied by side walls 18 and 19 against the film edges, such walls being coupled between the upper and lower plates as illustrated in FIG. 3. In other words should the film tend to be driven slightly toward side wall 18, the film edge presses against side wall 18 and since the film is unable to buckle for the reasons previously set forth, it "unskews" due to the above-mentioned film/roller slippage. Skewing in the opposite angular direction enables the opposite side wall 19 to unskew the film in like manner. The reaction forces induced by side walls 18 and 19 produces these results regardless of the direction in which the film is being driven. The first and second anti-buckling means could take many forms. For example pairs of narrow elongated members could straddle the film adjacent the rollers and could conceivably be rods or wires, rather than plates, so long as they are capable of resisting buckling.

It should be understood that other components and configurations may be substituted for those described in order to practice the invention, and the invention is to be limited only by the permissable scope of the following claims. For example, the term "plates" is not to be restricted to flat members but could be somewhat curved.

I claim:

1. Film transport device comprising:
 first antibuckling means for pushing against at least a portion of one surface of said film when said film tends to buckle;
 second antibuckling means for pushing against at least a portion of the opposite surface of said film when said film tends to buckle;
 positioning means for providing a separation gap between said first and second antibuckling means less than about 40 mils;
 a first pair of film drive rollers having sufficient compliance to permit slippage of said film with respect to said first pair of drive rollers;
 a second pair of film drive rollers having sufficient compliance to permit slippage of said film with respect to said second pair of drive rollers;
 drive means for producing bi-directional rotation of said first and second pairs of drive rollers at the same angular velocity; and,
 means for positioning the bytes of said first and second pairs of drive rollers adjacent said first and second antibuckling means adjacent the gaps thereof.

2. The combination as set forth in claim 1 wherein the widths of said antibuckling means are greater than the length of said first and second pair of drive rollers.

3. The combination as set forth in claims 1 or 2 wherein the lengths of said first and second pair of drive rollers are substantially less than the widths of said antibuckling means.

4. The combination as set forth in claims 1 or 2 wherein said gap is about 20 mils.

5. The combination as set forth in claim 3 wherein said gap is about 20 mils.

6. The combination as set forth in claims 1, 2 or 5 wherein said plate members are positioned between said first and second pair of drive rollers.

7. The combination as set forth in claim 3 wherein said plate members are positioned between said first and second pair of drive rollers.

8. The combination as set forth in claim 4 wherein said plate members are positioned between said first and second pair of drive rollers.

9. Film transport device comprising:
 a first plate member;
 a second plate member;
 positioning means for providing a separation gap between said first and second plate members less than about 40 mils;
 a first pair of film drive rollers having sufficient compliance to permit slippage of said film with respect to said first pair of drive rollers;
 a second pair of film drive rollers having sufficient compliance to permit slippage of said film with respect to said second pair of drive rollers;
 drive means for producing bi-directional rotation of said first and second pairs of drive rollers at the same angular velocity; and,
 means for positioning the bytes of said first and second pairs of drive rollers adjacent said gap.

10. The combination as set forth in claim 9 wherein the widths of said plate members are greater than the length of said first and second pair of drive rollers.

11. The combination as set forth in claims 9 or 10 wherein the lengths of said first and second pair of drive rollers are substantially less than the widths of said plate members.

12. The combination as set forth in claims 9 or 10 wherein said gap is about 20 Mils.

13. The combination as set forth in claim 11 wherein said gap is about 20 mils.

14. The combination as set forth in claims 9, 10 or 13 wherein said plate members are positioned between said first and second pair of drive rollers.

15. The combination as set forth in claim 11 wherein said plate members are positioned between said first and second pair of drive rollers.

16. The combination as set forth in claim 12 wherein said plate members are positioned between said first and second pair of drive rollers.

17. Film transport device comprising:
 a first plate member;
 a second plate member;
 a pair of side walls for defining a separation gap between said upper and lower plate members less than about 40 mils;
 a first pair of film drive rollers having sufficient compliance to permit slippage of said film with respect to said first pair of drive rollers;
 a second pair of film drive rollers, having sufficient compliance to permit slippage of said film with respect to said second pair of drive rollers;
 drive means for producing bi-directional rotation of said first and second pairs of drive rollers at the same angular velocity; and, means for positioning the bytes of said first and second pairs of drive rollers adjacent said gap.

18. The combination as set forth in claim 17 wherein the widths of said plate members are greater than the length of said first and second pair of drive rollers.

19. The combination as set forth in claims 17 or 18 wherein the lengths of said first and second pair of drive rollers are substantially less than the widths of said plate members.

20. The combination as set forth in claims 17 or 18 wherein said gap is about 20 mils.

21. The combination as set forth in claim 19 wherein said gap is about 20 mils.

22. The combination as set forth in claims 17, 18 or 21 wherein said plate members are positioned between said first and second pair of drive rollers.

23. The combination as set forth in claim 19 wherein said plate members are positioned between said first and second pair of drive rollers.

24. The combination as set forth in claim 20 wherein said plate members are positioned between said first and second pair of drive rollers.

25. The combination as set forth in claims 17, 18, 21, 23 and 24 wherein said side walls are coupled to said upper and lower plate members.

26. Film transport device comprising:

first antibuckling means for pushing against at least a portion of one surface of said film when said film tends to buckle;

second antibuckling means for pushing against at least a portion of the opposite surface of said film when said film tends to buckle;

positioning means for providing a separation gap between said first and second antibuckling means;

a first pair of film drive rollers, at least one of said first pair of drive rollers having sufficient compliance to permit slippage of said film with respect to said first pair of drive rollers;

a second pair of film drive rollers having sufficient compliance to permit slippage of said film with respect to said second pair of drive rollers;

drive means for producing bi-directional rotation of said first and second pairs of drive rollers at the same angular velocity; and, means for positioning the bytes of said first and second pairs of drive rollers adjacent said first and second antibuckling means adjacent the gaps thereof.

27. The combination as set forth in claim 26 wherein said first and second pair of drive rollers are rigidly rotationally coupled together.

28. The combination as set forth in claims 26 or 27 wherein said gap is about 20 mils.

* * * * *